United States Patent
Fukuchi et al.

(10) Patent No.: US 10,175,369 B2
(45) Date of Patent: Jan. 8, 2019

(54) SIGNAL DATA PROCESSING FOR RADIATION DETECTION

(71) Applicant: RIKEN, Saitama (JP)

(72) Inventors: Tomonori Fukuchi, Kobe (JP); Shinji Motomura, Kobe (JP); Shuichi Enomoto, Okayama (JP)

(73) Assignee: RIKEN, Saitama (JP)

( * ) Notice: Subject to any disclaimer, the term of this patent is extended or adjusted under 35 U.S.C. 154(b) by 1080 days.

(21) Appl. No.: 14/334,642

(22) Filed: Jul. 17, 2014

(65) Prior Publication Data

US 2015/0025852 A1    Jan. 22, 2015

(30) Foreign Application Priority Data

Jul. 19, 2013   (JP) .................................. 2013-150809

(51) Int. Cl.
   *G01T 1/29*   (2006.01)
   *G01T 1/24*   (2006.01)
(52) U.S. Cl.
   CPC ............. *G01T 1/2928* (2013.01); *G01T 1/24* (2013.01)
(58) Field of Classification Search
   CPC ........... G01T 1/24; G01T 1/241; G01T 1/244; G01T 1/2928
   See application file for complete search history.

(56) References Cited

U.S. PATENT DOCUMENTS

| 4,070,578 A | * | 1/1978 | Timothy | G01T 1/2957 250/207 |
| 5,873,054 A | * | 2/1999 | Warburton | G01T 1/171 250/370.06 |

(Continued)

FOREIGN PATENT DOCUMENTS

| JP | 2001-4752 A | 1/2001 |
| JP | 2005-208057 A | 8/2005 |
| JP | 2010-107312 A | 5/2010 |

OTHER PUBLICATIONS

Timothy et al., One-dimensional photon-counting detector array for use at EUV and soft x-ray wavelengths, Jul. 1975, Applied Optics, vol. 14, No. 7, pp. 1632-1644.*

(Continued)

*Primary Examiner* — Janet Suglo
*Assistant Examiner* — Liam R Casey
(74) *Attorney, Agent, or Firm* — Seed IP Law Group LLP

(57) ABSTRACT

To make correct determination of electric charge collection among signals from a semiconductor radiation detector, provided in an embodiment of the present invention is a signal data processing method. The method includes a step of calculating timing data sequences unique to channels (timing data calculation step S02), each of channels corresponding to each of plural electrodes of the radiation detector, from detection signal data sequences. Then, while making a comparison with a first threshold value, a data value for the timing data sequence at timing when a predetermined delay time is elapsed after the timing data sequence reached the first predetermined value is selected as a timing data value for determination for the channel (delay and selection step S04). Finally, by comparing the timing data value for determinations for channels with a second threshold value, a detection signal data sequence greater than or equal to the second threshold value is determined to be a detection signal data sequence for a channel that actually collected the electric charge (determination step S06). In embodiments of the present invention a signal data processing device and radiation detection system are also provided.

10 Claims, 8 Drawing Sheets

(56) References Cited

U.S. PATENT DOCUMENTS

| | | | |
|---|---|---|---|
| 6,521,894 B1* | 2/2003 | Iwanczyk | G01T 1/2928 |
| | | | 250/370.11 |
| 2002/0153492 A1* | 10/2002 | Sekine | G01T 1/2018 |
| | | | 250/370.11 |
| 2005/0139775 A1 | 6/2005 | Gono et al. | |
| 2006/0015290 A1* | 1/2006 | Warburton | G01T 1/17 |
| | | | 702/178 |
| 2009/0039271 A1* | 2/2009 | Farsoni | G01T 1/202 |
| | | | 250/367 |
| 2009/0057562 A1* | 3/2009 | Heijne | G01T 5/02 |
| | | | 250/370.07 |
| 2010/0102240 A1 | 4/2010 | Fukuchi et al. | |
| 2010/0181491 A1* | 7/2010 | Karim | G01T 1/247 |
| | | | 250/394 |
| 2011/0095173 A1 | 4/2011 | Menge et al. | |
| 2012/0112083 A1* | 5/2012 | Zhang | G01T 1/1642 |
| | | | 250/370.11 |
| 2013/0126748 A1* | 5/2013 | Rao | G01T 1/247 |
| | | | 250/394 |
| 2013/0168562 A1* | 7/2013 | Brambilla | G01T 1/241 |
| | | | 250/370.01 |

OTHER PUBLICATIONS

Jordanov et al. "Digital Synthesis of Pulse Shapes in Real Time for High Resolution Radiation Spectroscopy," *Nuclear Instruments and Methods in Physics Research*, 1994, 337-345.

Jordanov et al., "Digital Techniques for Real-Time Pulse Shaping in Radiation Measurements," *Nuclear Instruments and Methods in Physics Research*, 1994, 261-264.

Fukuchi et al., "A Digital Signal Processing Module for Ge Semiconductor Detectors," *IEEE Transactions on Nuclear Science*, 2011, 7 pp., retrieved from http://ieeexplore.ieee.org, Digital Object Identifier 10.1109/TNS.2011.2109968.

\* cited by examiner

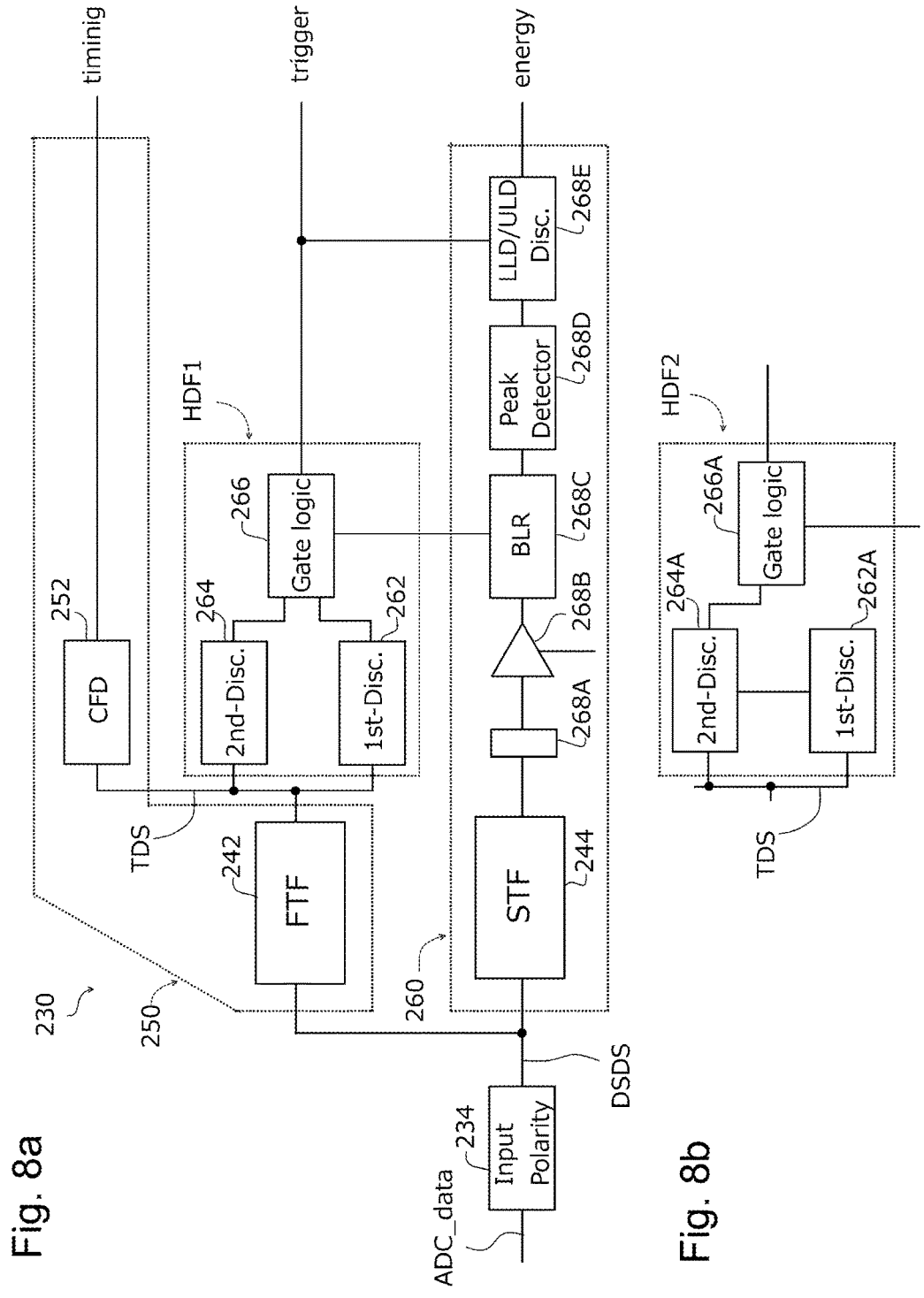

SIGNAL DATA PROCESSING FOR RADIATION DETECTION

CROSS-REFERENCE TO RELATED APPLICATIONS

This application is based upon and claims the benefit of priority to Japanese Patent Application No. 2013-150809, filed on Jul. 19, 2013, the contents of which are incorporated herein by reference in its entirety.

TECHNICAL FIELD

The present invention relates to signal data processing for radiation detection. More specifically, the present invention relates to a method and a device for signal data processing for radiation detection, and a radiation detection system, used for a radiation detector having a semiconductor to which plural electrodes are attached.

DESCRIPTION OF THE RELATED ART

Radiation detectors of superior energy resolution having a semiconductor crystal such as germanium (hereinafter referred to as "semiconductor radiation detectors") have been manufactured for detecting gamma-rays, X-rays, alpha rays, beta rays, and so on. Among such detectors are multi-electrode type semiconductor radiation detectors that have plural electrodes formed on the surface of the semiconductor. The multi-electrode semiconductor radiation detectors can be used to determine points where radiations made interactions with the semiconductor, or interaction positions. For such a detector, an appropriate signal processing should be performed against detected signals from the plural electrodes. The signal processing is carried out generally for each of signal paths (channels) corresponding to each of the plural electrodes.

The multi-electrode semiconductor radiation detectors are regarded as promising ones for advanced applications. An example is Compton cameras, which can be used for obtaining distribution images of radiation sources using information on interaction positions, as well as energy and dose information given by the radiation such as gamma rays to the semiconductor. Patent Document 1 (JP 2005-208057 A) discloses a multi-electrode semiconductor radiation detector used for Compton cameras that has been developed by the inventors of the present application. Once interaction positions are determined with sufficient preciseness, it is possible to determine incoming directions of radiations with accuracy; thereby the resolution of images will be improved after post processing for visualization purposes or the like.

Recently digital processing schemes are adopted for the signal processing for the multi-electrode semiconductor radiation detectors. Initial stage of the signal processing converts an electric charge amount generated inside the semiconductor according to an interaction event with a radiation ray into a voltage by use of a pre-amplifier, which is implemented in an analog circuit technology with FETs (field effect transistors), for example. The voltage is then converted into a detection signal data sequence (DSDS) by an analog-to-digital converter (ADC) for the purpose of a following processing, where the detection signal data sequence is a time-series digital data. Processing the detection signal data sequence through numerical computation using digital filter processing enables to extract information that characterizes the radiation, timing, an energy value, a dose amount, and so on. When such information is extracted correctly for the detection signal data sequence for each channel corresponding to each electrode, then the timing, the energy, and the dose amount are correctly derived, and an interaction position can be determined. The processing techniques have been improved according to recent advancement of ADCs, such as flash ADCs, and according to advancement of integrated circuit technology for other digital processing. For example, the inventors reported development and performances of a digital signal processing device having multi-electrode semiconductor radiation detectors that is suitable for Compton cameras (Non Patent Document 3: T. Fukuchi et al., IEEE Trans. Nucl. Sci., 58 (2), pp. 461). In addition, a similar digital technique has been developed that enables a flexible processing, and, as a result, advanced analyzing schemes are available these days (see for example, Patent Document 2: JP 2010-107312).

REFERENCES

Patent Documents

Patent Document 1: JP 2005-208057 A (U.S. Patent Application Publication No. 2005/139775 A1)
Patent Document 2: JP 2010-107312 A (U.S. Patent Application Publication No. 2010/102240 A1)

Non-Patent Documents

Non-Patent Document 1: V. T. Jordanov and G. F. Knoll "Digital synthesis of pulse shapes in real time for high resolution radiation spectroscopy", Nuclear Instruments and Methods in Physics Research, A 345 pp. 337-345, (1994)
Non-Patent Document 2: V. T. Jordanov et al., "Digital techniques for real-time pulse shaping in radiation measurements", Nuclear Instruments and Methods in Physics Research, A 353 pp. 261-264, (1994)
Non-Patent Document 3: Tomonori Fukuchi et al., "A Digital Signal Processing Module for Ge Semiconductor Detectors", IEEE Transactions on Nuclear Science, Vol. 58, No. 2, pp. 461-467, (2011), DOI 10.1109/TNS.2011.20109968

BRIEF SUMMARY

Technical Problem

The inventors of the present application have tried to improve accuracy in determination of interaction positions. Such process is referred to as an "interaction positions refining process (IPRP)" in the present application. Generally speaking, although a signal due to charge collection, or a charge signal, is obtained from an electrode that covers a region where the interaction took place, other type of signals that were induced by movement of the electric charge, or induced signals, are also found for other electrodes. The induced signals are observed especially at electrodes adjacent to the electrode that gave the charge signal and usually have small amplitude than the charge signal.

The induced signals may be useful for the interaction positions refining process. That is, although the induced signals are not suitable for deriving energy values, they can be utilized for determining the interaction positions with accuracy. This is because the induced signals from electrodes adjacent to the electrode that gave the charge signal have waveforms and amplitude that depends on the interaction positions; therefore, they carry information with respect to the detailed interaction position within the volume region inside the semiconductor covered by the electrode that gave the charge signal.

However, after repeated experiments with respect to the interaction positions refining process by applying the digital signal processing device having appropriate detection capability of energy and timing of the radiation ray, or gamma ray, for such purpose, we found that there may be a number of events for which the charge signal and the induced signals are difficult to distinguish from one another. Since inaccurate detection of the charge signal means incorrect detection of the interaction events, it is impossible to determine which electrode is actually covering the region of interaction.

In particular, since a threshold for signal detection is set low when low energy radiation rays are to be detected, erroneous detection may be frequent in which an induced signal is attributed to a charge signal in error, merely because the signal becomes larger than the reduced threshold value. Such erroneous detection may also occur when significant energy has been given to the semiconductor by radiation rays, and thus the induced signal is significant. As a result, it may be impossible to determine which channel actually detected the radiation rays. Moreover, when operations applied to the induced signals are ones that should have been applied to a charge signal to obtain radiation energy and detection timings, the information obtained is incorrect and useless, and therefore the amount of unnecessary processing would build up. In such a situation, there would be a substantial disadvantage in the processing, such as efficiency deterioration of the processing operation and diminished ratio of correct information out of the actual number of hit event in the detector in the signal processing.

If a scheme is established in which a charge signal is precisely distinguished from the induced signals in short time, then it is expected that accurate information such as energy and detection channels will be available without unnecessary computation. Moreover, the interaction positions refining process will become practical if the waveforms of the induced signals from electrodes adjacent to the electrode that gave the charge signal are used.

The present invention is to solve at least some of the problems stated above. The present invention contributes to improving the practicality of radiation detection that uses a multi-electrode semiconductor radiation detector.

Solution to Problem

The inventors of the present invention gathered a large number of detection signals from the multi-electrode semiconductor radiation detector in the conventional scheme, and studied detected signals that were determined as ones of interaction. As a result, the inventors have come to a conclusion that it is impossible to have the proper judgment with sufficient accuracy between the charge signal and the induced signal, while pursuing the conventional scheme.

Then the inventors have intensively studied a scheme for proper determination of the charge signal regarding the detection signal data sequences unique to channels and data sequences after shaping the waveforms obtained from plural electrodes. As a result, the inventors have found that the obtained data sequence is attributable to a charge signal with high accuracy if a certain process is used for a timing data sequence (TDS), which is a data sequence that is obtained from the detection signal data sequence by shaping their waveform.

Therefore, in one aspect of the present invention, provided is a signal data processing method for a radiation detector having a semiconductor with a plurality of electrodes attached thereto comprising steps of timing data calculation, delay and selection, and determination. The timing data calculation step calculates timing data sequences unique to channels, where the timing data sequence represents timing when a radiation interacted with the semiconductor. This process is carried out by obtaining detection signal data sequences unique to channels from detection signals of electrodes for the radiation detector, and processing numerical computation consecutively on data values in a first waveform shaping window among the detection signal data sequences unique to the channels. The delay and selection step is carried out by comparing data values in the timing data sequences unique to channels with a first threshold value, and selecting, as a timing data value for determination (TDVD) of each channel, a data value of the timing data sequence when a predetermined delay time has elapsed since one of the data values reached the first predetermined value. And the determination step is carried out by comparing the timing data value for determination for each channel with a second threshold value, and determining a detection signal data sequence that made a corresponding timing data value for determination greater than or equal to the second threshold value to be one for a channel that actually collected the electric charge generated in the semiconductor through an interaction with a radiation ray.

The present invention can be practiced in another aspect of the signal data processing device. That is, in another aspect of the present invention, provided is a signal data processing device for processing detection signal data sequences unique to channels corresponding to a plurality of electrodes for a radiation detector having a semiconductor into which the signal data processing method set forth above is implemented.

The present invention can be practiced in yet another aspect of the semiconductor radiation detection system. That is, in yet another aspect of the present invention provided is a radiation detection system comprising a radiation detector, an analog-to-digital converter (ADC) and a signal data processing device. The radiation detector has a semiconductor to which a plurality of electrodes is attached. The ADC receives a detection signal for each channel that is associated with each of the plurality of electrodes and outputs detection signal data sequences. The signal data processing method set forth above is implemented into the signal data processing device, which receives a detection signal data sequence for each channel from the ADC.

The channel in the aspects of the present invention denotes a path for signal transmission for a signal that is associated with an electrode formed on the semiconductor. A channel is associated with each electrode for the aspects of the present invention in principle. Thus the term channel is used for identifying the transmission path and the electrode. However, this does not mean that a practical configuration is excluded from the scope of the present invention even when the configuration adopts an association of a single channel with plural electrodes, or an association of plural channels with a single electrode.

In the aspects of the present invention, when an interaction takes place in a region of the semiconductor covered by each electrode, the electrode collects the electric charge generated by the interaction, where the electrode is attached to a region where the interaction took place. Thus the signal from such an electrode becomes a signal representing the collected electric charge amount. The signal representing the electric charge amount is usually transmitted to a charge sensitive preamplifier that adopts FETs. The output of the preamplifier becomes a voltage signal that reflects the electric charge amount deposited by the radiation ray to the semiconductor during the interaction. The voltage signal is further processed in such a manner that the information contained is substantially preserved by, such as, pole-zero processing. The series of processes until this stage are usually carried out through analog circuit technique.

A charge signal is obtained from the electrode that actually collected electric charge, where the charge signal represents electric charge amount generated in the semiconductor region covered by the electrode. The charge signal represents the amount of the electric charge that was generated due to the interaction, traveled through the semiconductor, and has been collected, even if the signal is transmitted through the analog circuit mentioned above. In addition to that, induced signals may be obtained from electrodes that did not collect the electric charge, where the induced signals have almost coincident timing with the charge signal. The induced signals pass through the signal processing route including the preamplifier. In aspects of the invention that carry out determination step using the first threshold value, the predetermined delay time, and the second threshold value, the correct determination of the channel that collected the electric charges is possible, even when the detector configuration is such that the induced signals are generated at almost coincident timing with the charge signal.

It should be noted that all channels for the multi-electrode semiconductor detector are processed identically in the signal processing. Therefore, in the aspects of the present invention, signals of the same number as the channels will be typically processed in the identical manner. In this regard, it is which channel outputs a charge signal that should be determined in the aspects of the present invention. Actual detection signals unique to channels may include the induced signals as stated above. Thus, in the aspects of the present invention, the determination should be made typically as to whether the signal is a charge signal or not, while distinguishing from an induced signal. It should also be noted that, from a practical point of view of the present invention, it may be required to properly treat a type of event caused by plural times interactions by a single radiation ray, where the interactions generate charge signals for different electrodes. This type of event is called a multi-hit event. In the multi-hit event, charge signals are transmitted by plural channels, which is a part of all the channels that cover a region where the positions should be determined in the semiconductor, such as all electrodes arranged in one direction. If such a general situation is considered, the number of channels to be determined as to whether the charge signals are found or not is not necessarily one. When plural channels carry charge signals, the detection signal in each channel may include overlap signals of charge and induced signals. Even when such overlapped signals are presented, it is possible to have correct determination for finding a charge signal in the detection signal, if appropriate conditions are adopted in the aspects of the present invention.

Next, features in the aspects of the present invention will be explained individually. The detection signal data sequence is a sequence of time-series digital data sampled from a detection signal. The detection signal data sequence has been converted into a digital format in an appropriate sampling frequency and quantization bit length that would not cause any problematic loss of information, after preprocessing as needed.

The timing data calculation step handles the detection signal data sequence. The function of the timing data calculation step is to calculate a timing data sequence that will be used in determining timing of interaction between the radiation ray and the semiconductor. The timing data sequence is, for example, a data sequence suitable for deriving the interaction time point between the radiation ray and the semiconductor. The timing data calculation step includes a numerical computation that uses the detection signal data sequence data values, especially ones in a time window, or a first waveform shaping window (1st WSW), out of consecutively incoming values of the detection signal data sequence. It follows that, the waveform indicated by the timing data sequence is a shaped waveform of the detection signal data sequence. The timing data calculation step can be implemented by continuous numerical computation over the values of the detection signal data sequence. It is to be noted that, in a preferred aspect of the present invention, an energy value derivation from a charge value in a channel is performed through waveform shaping of the detection signal data sequence of the same channel over a longer time window, or second waveform shaping window (2nd WSW) (charge signal energy calculation step). The timing data calculation step may be a numerical computation process on a waveform of the detection signal data to obtain a trapezoidal wave or a triangular wave that reflects features of the original waveform. For example, let us assume the case when the detection signal data sequence to be processed is a sequence of data that represents following series of values: values of no detection, such as "0", up until a time point, values varying on or after the time point, and values relaxing according to a time constant afterward. Then, a triangular wave having a height (pulse height) corresponding to the values in the variation is obtained by the process (see, for example, Non Patent Documents 1 and 2). Such a process can be explained in a simple qualitative manner as a combination of a low-pass filter operation (integration operation) and a high-pass filter operation (differentiation operation), where the integration enables averaging for avoiding a miss of significant signal due to noise, whereas the differentiation enables precise determination of timing. The process is implemented in an embodiment of the invention into a numerical computation circuit to calculate convolution with a predetermined function by use of so-called a digital filter technique. Timing data sequences obtained through such a process are also time-series data sequences unique to channels. It should be noted that the charge signal energy calculation step is a numerical computation process that uses 2nd WSW, which is longer than the 1st WSW, and is similar to the timing data calculation step mentioned above. In the charge signal energy calculation step, however, the conditions are set suitable for energy calculation purposes. For example, the convolution calculation is carried out with another predetermined function that is suitable for energy calculation in the charge signal energy calculation step.

Data values in the timing data sequence are compared with a threshold value, or first threshold value in the aspects of the present invention. The first threshold value is used to find a rise of the signal and to initiate the clocking of the predetermined delay time, or to start timing operation. Then a data value in the timing data sequence at the delay time after the clocking initiated time point, or for samples equivalent to the delay time, is compared with another threshold value, or second threshold value. The delay in the time realizes delayed determination that shifts the determination timing along the time axis. A data value in the timing data sequence to be compared with the second threshold value is called a timing data value for determination. A detection signal data sequence corresponding timing data value for determination reached the second threshold value is determined as a detection signal data sequence carrying a charge signal, or one from a channel that collected the electric charge in the aspects of the present invention. This is the process of the determination in the aspects of the present invention. In this regard, since the first and the second threshold values act differently, the values for the first and the second threshold values are set independently; the first and second threshold values may be set to the same or different values with each other. Moreover, in comparing the data values in the timing data sequence with the first or the second threshold value, the data value is regarded as having reached the threshold value when the data value becomes the identical value of the threshold or when their magnitude relationship is inverted than ever. This also applies to comparison operation to determine the elapse of the delay time for specifying the timing data value for determination. Although there may be various different implementations for the comparison and delay on the surface depending on setting of the origin or positive/negative signs for the values, whether the comparison or delay operation is performed or not should be understood based on the substantial aspect of the invention that is appropriate for defining the scope of the invention.

Advantageous Effect of the Invention

According to a signal data processing method, signal data processing device, or a radiation detection system provided by any aspect of the present invention, the following advantages are achieved individually or in combination with one another.

In the first place, a signal data processing scheme in one aspect of the present invention is relatively easy for implementation. The scheme enables correct determination of a channel that actually collected the electric charge. A relatively simple processing including a delay and comparison with a threshold is carried out regarding the data of timing data sequence, which have been conventionally obtained. The scheme requires a device with a limited scale for implementation, and can be practiced for all the channels.

Any of the aspects of the present invention, which enables correct determination of a channel that collected the electric charge, is useful for preprocessing before the data processing to calculate energy values with multi-electrode radiation detectors. Once a channel that collected the electric charge has been correctly determined, it becomes easy, efficient, and rapid to perform the process, only by choosing ones to be processed later from the detection signal data in plural channels, or only by storing necessary data.

Moreover, a scheme in any of the aspect of the present invention, which enables correct determination of a channel that collected the electric charge, is useful as a preprocessing scheme before an interaction positions refining process. Correct determination of a channel that collected the electric charge also enables correct determination of induced signals; therefore, it is possible to use signals from electrodes adjacent to an electrode that collected the electric charge for improving the position determination of the interaction position.

In addition, it is possible to improve substantial sensitivity for a lower energy range when detecting interactions between radiation and radiation detectors having a semiconductor with radiation rays, in any of the aspects of the present invention. An energy threshold enough small to allow minute signal detection can be adopted in any of the aspects of the present invention because induced signals do not deteriorate the detection with the reduced threshold.

On top of that, it is possible to detect high dose amount radiation effectively in any of the aspects of the present invention. That is, correct determination of a channel of the electric charge collection makes it possible to improve through put by restricting the operation to the charge signal. Similarly, it is possible to correctly address a pile-up in charge signals and induced signals when detections of radiation rays take place with short time intervals.

BRIEF DESCRIPTION OF THE SEVERAL VIEWS OF THE DRAWINGS

FIGS. 8a-8b are functional block diagrams indicating a signal processing function blocks implemented in hardware of a signal data processing device in an embodiment of the present invention.

DETAILED DESCRIPTION

Now an embodiment of a signal data processing in the present invention is described. In the first place, a conventional data processing is described to facilitate understanding and then principles and a detailed embodiment of a signal data processing of the present invention are described. For all drawings, the common reference signs are given to common parts or elements unless otherwise noted. In the following description, processing contents, processing sequences, elements, and process details can be modified as needed so long as they fall within the spirit of the present invention. Thus the scope of the present invention is not limited to the specific examples described below.

1. Conventional Data Processing

Figure 1:
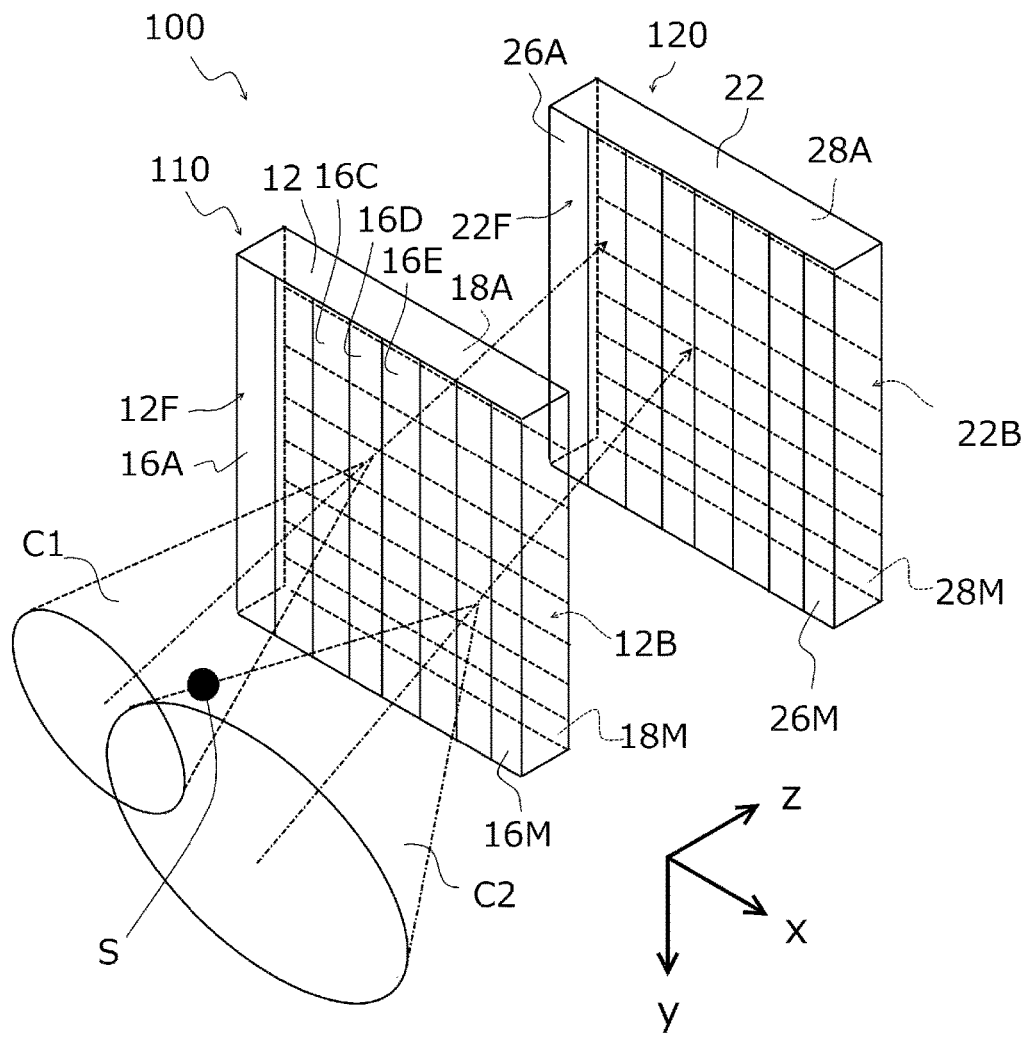
FIG. 1 is a schematic diagram illustrating a structure of a Compton camera, which is an example of the radiation detectors having a semiconductor, adopted commonly in the conventional scheme and the embodiment of the present invention.
Figure 2A:
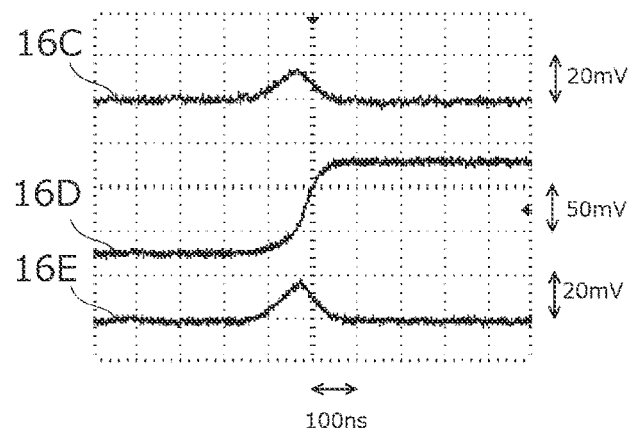
FIGS. 2a-2c are graphs indicating actual signals obtained through strip electrodes attached to a semiconductor in the radiation detectors.
Figure 2B:
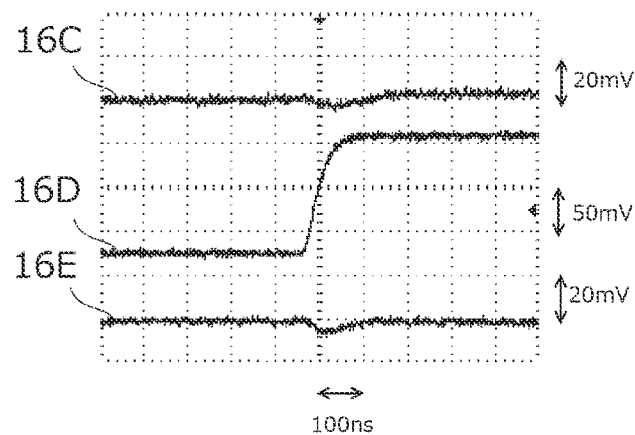
Figure 2C:
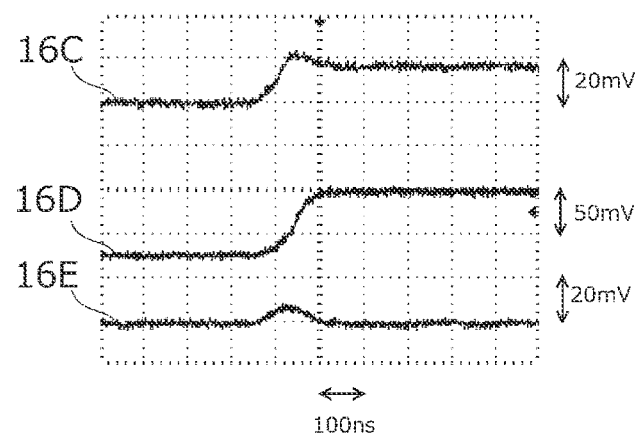

In the first place conventional data processing operation is described to facilitate the understanding of the inventive concept, where the operation has been practiced in data processing of the detection signal for radiation detectors having a semiconductor. FIG. 1 is a schematic diagram illustrating a structure of a Compton camera, which is an example of the radiation detectors having a semiconductor, adopted commonly in the conventional scheme and the present embodiment. Moreover, FIGS. 2a-2c are graphs indicating actual signals obtained through strip electrodes attached to a semiconductor in the radiation detectors.

Generally speaking a determination will be made concerning detection signal of the electric charge from the separated electrodes, or as to which electrode collected the electric charge, for the multi-electrode radiation detector. According to such a determination, what is determined is which electrode covers a region where the interaction actually took place. Moreover, it may be possible to determine a position in a depth direction from the electrode to the positon within the region covered by the single electrode. For that purpose, time dependent waveform variation in the detection signal waveform is utilized. Combining these would enable us to determine the interaction position with respect to in-plane and thickness directions within the semiconductor plate having a thickness.

Some of the multi-electrode semiconductor radiation detectors have plural electrodes with extending shape, or strip electrodes, on both sides of the semiconductor crystal. An example of the detectors is a radiation detector in the Compton camera as depicted in FIG. 1, which is a typical radiation detector to which the present embodiment is applied.

A Compton camera 100 is an example device having a pair of radiation detectors, each of which has a piece of semiconductor plate, as depicted in radiation detectors 110 and 120, where a Compton scattering in detecting medium such as the semiconductor is detected by two time interactions. The angle of incidence of the radiation ray is determined by applying kinematics of the Compton scattering to two detected positions and the energy information. That is, cone surface C1 is determined for a single radiation ray based on two interactions that have taken place in semiconductors 12 and 22 in the radiation detectors 110 and 120 respectively. Radiation source S emits radiation rays continuously; thus another cone surface (cone surface C2) is determined in a similar fashion from another radiation ray. Each cone surface represents possible incoming directions of radiation rays, thus determining a large number of such cone surface would yield positions and distributions of the radiation source S in three dimensional coordinates by the intersection region of the cone surfaces. Geometrical configurations such as axes and half-angles at the apexes for the cone surfaces C1 and C2 can be determined by appropriately processing the detection signals from the radiation detectors 110 and 120. It is imperative for such purposes to precisely carry out both of determination of the interaction positions with the radiation rays in the semiconductor 12 and 22 and measurement of energy to give the half-angles at apexes of the cone surfaces C1 and C2. Timing information is also used for determining whether detected interactions in the semiconductors 12 and 22 have been caused by a single radiation ray or they have been caused by multiple radiation rays, that is, whether estimating a cone surface is proper or not.

Next, detailed structure of the radiation detectors that make the Compton camera 100 is described by focusing on the radiation detector 110 as an example. The semiconductor 12 in the radiation detector 110 is a plate of semiconductor crystal of, such as, germanium, and multiple electrodes 16A-16M and 18A-18M are formed on the front and rear surfaces 12F and 12B respectively. The multiple electrodes 16A-16M and 18A-18M may be considered as sectioned electrodes on each side, thus the radiation detector 110 having the semiconductor 12 is a type of multi-electrode ones. The electrodes 16A-16M on the front surface 12F are group of strip electrodes, each extending along one direction (y direction), whereas the electrodes 18A-18M on the rear surface 12B are group of strip electrodes, each extending along another direction (x direction). Once an electrode, or a channel, that has collected the electric charge is correctly determined on both groups of the electrodes, then it is possible to determine a position in the xy plane, or in-plane of the semiconductor 12, where the radiation has interacted with the semiconductor. That is, x coordinate is determined based on which one of plural electrodes 16A-16M gives the electric charge in the semiconductor 12, whereas y coordinate is determined based on which one of plural electrodes 18A-18M gives the electric charge. As stated above, a charge signal is output from an electrode that covers the interaction position and induced signals are output from its adjacent electrodes for a single actual interaction event; therefore, it is necessary to correctly determine whether a signal is a charge signal or an induced signal. It should be noted that the radiation detector 120 having the semiconductor 22 is identical to the radiation detector 110 with respect to the structure mentioned above. That is, multiple electrodes 26A-26M and 28A-28M are formed on the front and rear surfaces 22F and 22B respectively of the semiconductor 22.

FIGS. 2a-2c indicate detection signals obtained from plural electrodes of an actual Compton camera. FIGS. 2a-2c are graphs of waveforms, or oscilloscope images, of voltages converted by a charge sensitive preamplifier from signals of the electrode 16D, which has actually collected the electric charge due to the actual interaction. The scales of voltage are indicated along the right axis and time scales along the horizontal axis. Reference numerals to electrodes are also used to indicate corresponding waveforms for reference purposes. The electrode 16D is selected because it has been depicted as an electrode that detected the initial interaction for the cone surface C1 in FIG. 1. Each figure also indicates waveforms processed similarly from the electrodes 16C and 16E, or adjacent ones to the electrode 16D. Since the detected signal from the electrode 16D has larger amplitude than the others, the vertical scale in the oscilloscope images for the signal is reduced to two fifth (⅖) for ones from the electrodes 16C and 16E. FIG. 2a depicts the case when the radiation had one interaction at a position separated in a thickness direction, or z direction in FIG. 1, from the electrode 16D in a region of the semiconductor 12 covered by the electrode 16D. In contrast, FIG. 2b depicts the case when the interaction position was closer to the electrode 16D in the thickness direction, or to the front surface 12F, in comparison with the case in FIG. 2a. Moreover, FIG. 2c depicts the case of multi-hit event. In the case of this multi-hit event, the radiation ray made two interactions: the radiation ray made the first interaction and scattered in a region of the semiconductor covered by the electrode 16D while depositing a part of the energy to the semiconductor material there, and immediately after the first interaction, the same radiation ray entered into another region of the semiconductor covered by the electrode 16C and made the second interaction there while all the remaining energy was absorbed there.

The signals from the electrode 16D in the FIGS. 2a and 2b illustrate ones for collection of the electric charge due to interactions, and are typical charge signals. These signals have been converted into voltages from electric charge values by such as a charge sensitive pre-amplifier, and their maximum voltages, or voltages after completing the electric charge collection, are proportional to the total the electric charges, or energy values of the radiation rays. FIGS. 2a and 2b show that signals are also observed from the electrodes 16C and 16E substantially at the same time of the observation of the charge signal in the electrode 16D. These signals are ones induced at the electrodes 16C and 16E due to variation of electric fields, which is caused by movement of generated electric charge, in the semiconductor 12 when the charge travels through a depletion layer in the semiconductor according to a bias electric field; thus the signals at the electrodes 16C and 16E are transient ones. That is, the induced signals vanish when the electric charge completes its movement, as indicated in FIGS. 2a and 2b. This corresponds to the fact that these electrodes do not collect the electric charge. In conventional approach, although induced signals are not charge signals, they are treated as if they were charge signals.

Furthermore, in the multi-hit event in which interactions took place in regions covered by the electrodes 16D and 16C by a single radiation ray as in FIG. 2c, not only a induced signal but a charge signal is added to the signal from the electrode 16C. In the example indicated in FIG. 2c, more energy is deposited by the radiation ray at a region covered by the electrode 16D, whereas less energy is deposited at a region covered by the electrode 16C. Therefore, an induced signal from a region covered by the electrode 16D is added in the waveform for the electrode 16C, whereas almost no induced signal is found on the electrode 16C.

The utility of the interaction positions refining process will be improved if the waveforms representing the interaction positions mentioned above, especially the difference between the induced signals, are utilized. Generally speaking, effects on electrodes due to variation of electric fields decreases according to distance; the interaction positions can be determined in detail by, such as, comparing magnitudes of induced signals from adjacent electrodes on both sides of an electrode that collected the electric charge. For example, in FIG. 2a the induced signals on the electrodes 16C and 16E are different, and one on the electrode 16E is relatively clear. This suggests that a position where the interaction took place in the region covered by the electrode 16D, which is sandwiched by the electrodes 16C and 16E, is closer to the electrode 16E. This is a principle of the interaction positions refining process in which an interaction position can be estimated with a resolution higher than the position accuracy fixed by a coverage area of electrodes.

Although the interaction positions are different for interaction events in reality, the following description assumes a single event unless otherwise noted.

2. Embodiment

In the embodiment of the present invention, provided is a signal processing scheme for correctly determining the channel that collected the electric charge, from detection signals mentioned above, or signals derived from such detection signals. The inventors thought of a scheme to distinguish a charge signal and an induced signal correctly by using a timing data sequence that is prepared for derive an accurate timing of an interaction between the radiation ray and the semiconductor.

The output of the charge sensitive preamplifier is converted into a digital signal after several processing steps in the analog stage mentioned above. The digital signal is a sampled and quantized numerical data sequence, with a certain sampling frequency, as usual. This digital data sequence is called a detection signal data sequence. Each channel gives each detection signal data sequence, and out of the detection signal data sequences, ones from channels related to an interaction carry pieces of information concerning a radiation ray that interacted with the semiconductor. An initial process for correctly deriving such pieces of information is called waveform shaping, which adopts numerical computation using a digital filter technique. By applying a sort of waveform shaping process to the detection signal data sequence, the timing data sequence is obtained. For multi-electrode detector having plural electrode, difference of signals among the electrodes, or channels are used in determining the interaction positions.

In the present embodiment, determination of the charge signal that is easily implemented into a device is performed based on a new signal processing scheme with respect to the timing data sequence, which is a data sequence after the waveform shaping.

2-1. Operational Principle

Figure 3A:
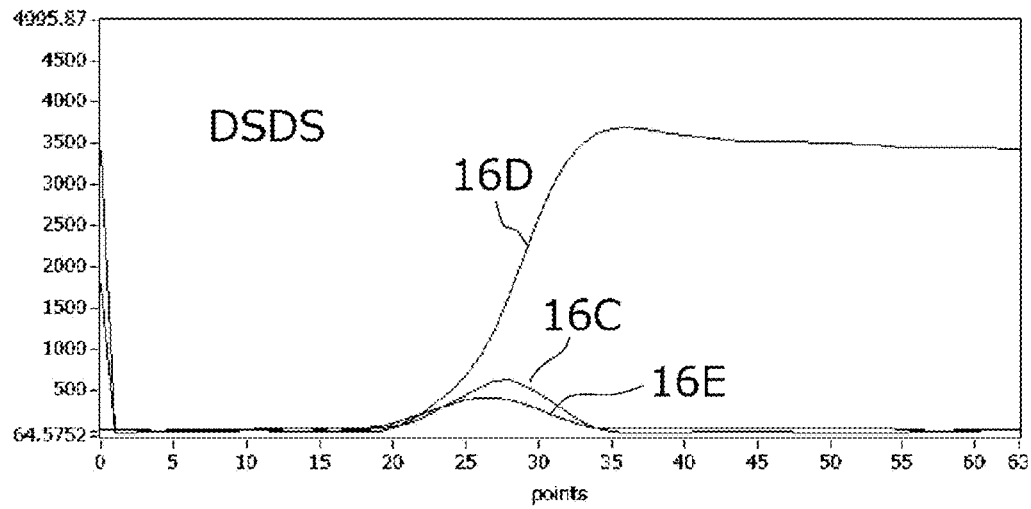
FIGS. 3a-3b depict graphs indicating waveforms of detection signals in the detection signal data sequences and indicating waveforms of timing data sequences that are directly processed based on actual measured example in an embodiment of the present invention.
Figure 3B:
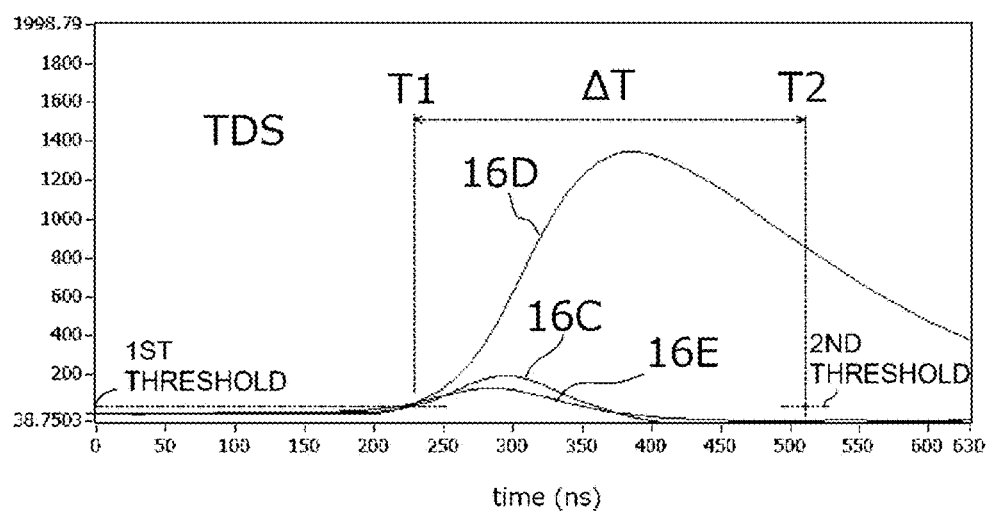

FIGS. 3a-3b depict graphs indicating waveforms of detection signals in the detection signal data sequences and indicating waveforms of timing data sequences that are directly processed based on actual measured example in the present embodiment. The figures depict waveforms for three channels obtained from the electrodes 16C, 16D, and 16E, including detection signal data sequences in FIG. 3a and timing data sequences in FIG. 3b. The detection signal data sequences in FIG. 3a have been obtained through similar processing to one for FIGS. 2a-2c. That is, the detection signal data sequences are ones just after converted into digital by sampling and quantizing with a certain sampling frequency and an appropriate bit length at the analog-to-digital converter (ADC) from signals output at the charge sensitive preamplifier. The horizontal axis of FIG. 3a denotes sample points of the sampled signals in order in the digital format, with a time axis having past time to the left and future time to the right as is usual with the general oscilloscope. The data have been sampled with a sampling rate of 100 MHz (sampling interval: 10 ns), of which 630 ns duration are depicted in the graph. The digitized values correspond to voltage values to be input into the ADC, or voltage values converted in analog circuit technique from signals present on the electrodes 16C, 16D, and 16E. As a result, the detection signal data sequences have linearity with the signal for the electric charge amount collected by the electrode 16C, 16D, or 16E (for the charge signal), or with the signal induced to the electrode (for the induced signal). On the other hand, the timing data sequences in FIG. 3b are ones obtained through wave shaping and used for determining timings of interaction of the radiation rays with the semiconductor. The scales of the vertical axis are identical for waveforms in each graph of FIGS. 3a and 3b, in contrast to FIG. 2.

The timing data calculation step in the present embodiment generates the timing data sequence through numerical computation over data values in the time window in the detection signal data sequence, or data values with, for example, different timings. The time window is called a first waveform shaping window (1st WSW). The timing data calculation step is typically a process of numerical computation to give convolution values between the detection signal data sequences and a predetermined waveform defined with a function (see, for example, Non Patent Documents 1 and 2). The timing data sequences may be generated even in a conventional scheme for later processing that is responsible for the radiation detection such as coincidence detection or hit rate count.

The inventors note that, if delay and threshold determination are combined, it would be possible to correctly determine that the channel has actually collected the electric charge, or that the signal at least includes the charge signal and is not purely induced signal.

In the first place, as indicated in FIG. 3b, a continuing comparison is made over values in the timing data sequence with a reference value (first threshold value, 30 digits in the graph). The data value of the timing data sequence at a future time point T2 is used, where the time point T2 is a time when a predetermined delay time ΔT (280 ns in the graphs, or 28 sample points) has elapsed from a time point T1, which is the time when a value in the timing data sequence reaches the first threshold value. The data value of the time point T2 is called a timing data value for determination, and is compared with another reference value (second threshold value, 30 digits in the graph). The timing data value for determinations for the electrodes 16C, 16D, and 16E at the time point T2 are ~−30, ~860 and ~−30 digits respectively, and these values are compared with the second threshold, 30 digits. This series of processes makes it possible to correctly determine that only the electrode 16D is the charge signal, or that only the channel of the electrode 16D is one that collected the electric charge. Once the first threshold value, second threshold value and the delay time are set in accordance with conditions of the measurement system by a pilot study, it is possible to correctly determine which channel has actually collected the electric charge based on the scheme mentioned above.

Now we explain whether a correct identification is possible or not when only a single reference value corresponding to the first threshold value were used for comparison. The bottom line is that it is difficult to correctly identify the charge signal when a simple comparison of values such as using a single reference value regarding the detection signal data sequence or its waveform shaped data sequence. It is actually observed from the data values for the timing data sequence in FIGS. 3a-3b. The electrode 16E is the fastest one, by a narrow margin, with a timing the first threshold value is exceeded, though it is not clearly indicated in the graph. Specifically, it is a time point of 230 ns for the data values for the timing data sequences from the electrodes 16C and 16D reach the first threshold value, however, data values in the timing data sequence from the electrodes 16E reaches the first threshold value at time point of 220 ns. Therefore, even when the timing data sequences are used, determination by comparison only with the first threshold value would not give a right result that the signal from the electrode 16D is the charge signal. The same timing analysis also applies to the comparison with the detection signal data sequences.

Figure 4A:
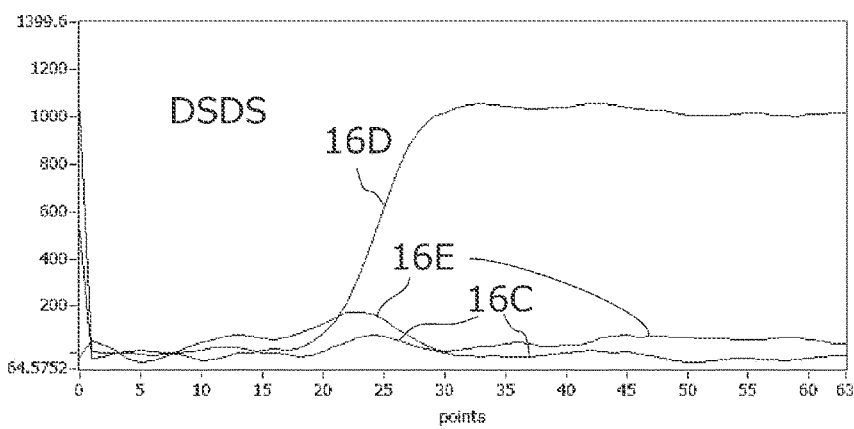
FIGS. 4a-4b depict similar graphs to ones in FIGS. 3a-3b for different measured example.
Figure 4B:
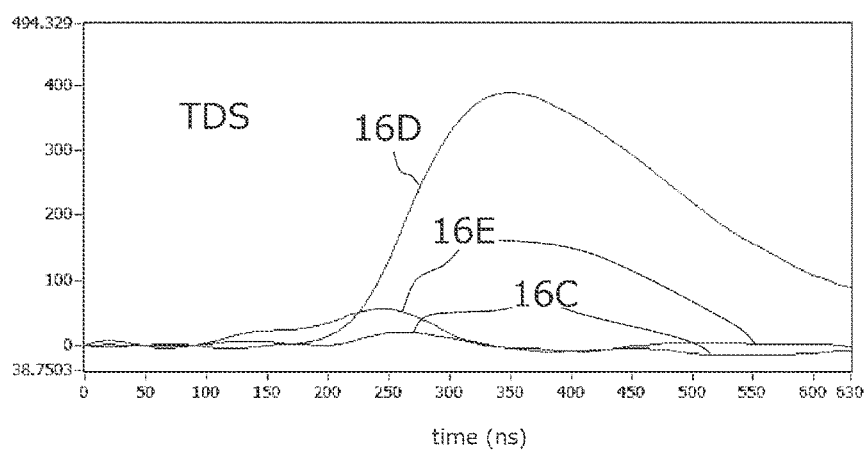

This point can also be clearly understood based on the explanation of another set of actually measured waveforms. FIGS. 4a-4b depict similar graphs to ones in FIGS. 3a-3b for different measured example. The signal from the electrode 16D is the charge signal in this example too. However, the rise of the signal from the electrode 16C that is an induced signal is earlier than one from the electrode 16D, by ~30 ns (TDS, FIG. 4b) and by ~100 ns (DSDS, FIG. 4a). As can be seen in this example, it is impossible to correctly determine with high probability the channel that has collected the electric charge only by using a single reference value.

The processing in the present embodiment is carried out for the timing data sequence as explained earlier. Although the determination step adopting delay and the comparison with the second threshold value regarding the timing data sequence as indicated in FIG. 3b may be apparently found to be practical even if the detection signal in the FIG. 3a is used in a similar fashion. However, it is advantageous to use the timing data sequences as in the present embodiment from a practical point of view. Each of the detection signals in the FIG. 3a shows a single voltage variation that reflects the electric charge, and the voltage value is maintained thereafter; but not all the actual signals show such variation. When the dose amount is high, such as interaction rate per time is high, then there may be a pile-up in which a charge signal is added on top of the maintained voltage due to the detection signal of the electric charge. In such a situation, it would be necessary to add a complex process, such as consecutively updating the baseline for the determination in response to the pile-up, to correctly finding the charge signals from the detection signal data sequence. In contrast, when a comparison is made on the timing data sequences (FIG. 3b) in the present embodiment, a process in the timing data calculation has a similar function to differentiation with a short time constant; thus the signal of the charge relaxes rapidly. Such a behavior is clearly depicted as a rapid relaxation from a time point in the timing data sequence of the charge signal. Thus, there is no need for such complicated process as updating the baseline for the determination when timing data sequence is used, even when a pile-up is present due to high rate events. That is, the timing data sequences are data sequences prepared while the pile-up is taken into account to some extent, there is no need to address specifically the pile-up when determining the charge signal correctly in the present embodiment. As stated above, the scheme of determination using the timing data sequence illustrated in the present embodiment is highly practical. Additional functional element that has been added to implement the scheme mentioned above is called "hit determination filter" in the present specification.

2-2. Signal Data Processing for the Hit Determination Filter

Figure 5:
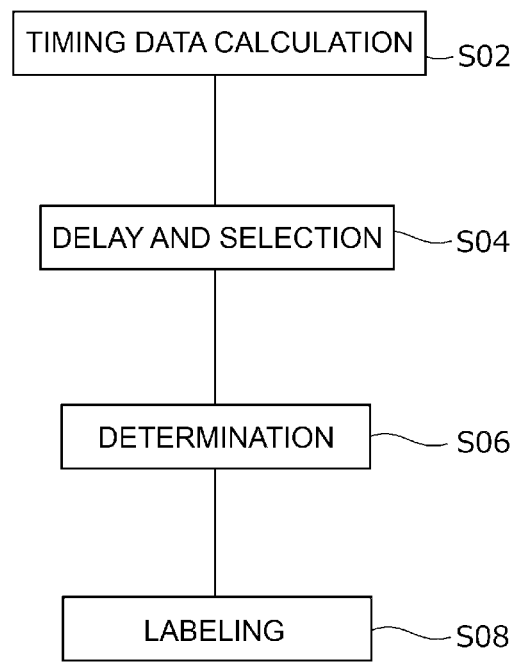
FIG. 5 is a flowchart indicating processing steps of a hit determination filter performed in a data processing device in an embodiment of the present invention.

The present invention implemented based on the operational principle mentioned above will be described in detail, especially for the function for practicing the hit determination filter. FIG. 5 is a flowchart indicating processing steps of a hit determination filter performed in a data processing device in the present embodiment. The detection signal data sequences of the detection signal unique to channels are processed in the present invention, where the channels correspond to plural electrodes in the radiation detectors having a semiconductor. A timing data calculation step S02 is carried out by numerical computation using data values at different time points in the data values in the 1st WSW of the detection signal data sequence. This process is used to calculate timing data sequence that reflects timing when the radiation interacted with the semiconductor.

A delay and selection step S04 includes comparing the data values of the timing data sequence with the first threshold value. Then timing of the predetermined delay time is started when the data value becomes or exceeds the first threshold value, and the data value in the timing data sequence at the time when the delay time has elapsed is selected as the timing data value for determination. It should be noted that the starting the timing of the predetermined delay time and determining the elapse of it may be appropriately implemented by any approach that a person skilled in the art can practice, such as initiating counting up of a counter corresponding to time point and finding that the counter becomes a predetermined value, or changing a readout address when the data values of the timing data sequence are stored into an addressable buffer.

A determination step S06 is carried out by comparing the timing data value for determination with the second threshold value, and finding that the timing data sequence having reached the second threshold value to be of a channel that collected the electric charge generated by an interaction between the radiation and the semiconductor. According to the scheme stated above, the signal data processing is practiced to precisely determine the channel that collected the electric charge.

In the present embodiment, it is preferable that a labeling step S08 is carried out as needed. The step is an arbitrary process step to make a timing data sequence that reached the second threshold value in the determination step S06 to be identifiable as a channel that collected the electric charge, by combining information to specify the electrode or the channel, and information to specify the interaction event. Specific examples for it are selecting only the timing data sequence that collected the electric charge, outputting some sort of data to specify the channel collected the electric charge, setting a sort of flag that indicate the determination result to each channel, asserting a sort of trigger signal for each channel, memorizing while the channel in a distinguishable manner from the other channels, and so on. Thus, the labeling step S08 may be practiced in various implementations. The labeling step S08 may be called a charge signal labeling step if it only processes determination as to whether the electric charge has been actually collected. Since information indicating a correct determination of the charge signal for each event is obtained according to the labeling step S08, processing after derivation of timing and energy become possible or easy. In addition, a measure as for which waveform should be chosen for precise position measurement based on the induced signals is obtained according to the labeling step S08.

The present embodiment can be practiced such that the labeling process S08 includes an induced signal labeling step. The induced signal labeling step is different from a charge signal labeling step, rather it is a process step to make it possible to identify logically which channel has a timing data sequence that failed to collect the electric charge. Typically for example, it is possible to estimate which channel would generate an induced signal based on the channel that generated the charge signal, if the structure of the electrodes are considered. In other example, it is reasonable to determine a channel that has generated an induced signal when its timing data sequence is concluded as not collected the electric charge after a comparison with the second threshold value even if the delay step was initiated based on a comparison with the first threshold value. The induced signal labeling step is also used in a later process.

One typical process to be performed for the detection signal data sequence for the channel that collected the electric charge is a charge signal energy derivation step (not shown in FIG. 5). An operation process necessary for calculating energy is carried out in that step, using data values in the detection signal data sequence that has been determined to have collected the electric charge in the determination step. The operation process in the step is also a sort of waveform shaping in a typical example. However, it is necessary to derive a precise amount of the electric charge to find a precise energy value that has been deposited by the radiation to the semiconductor. Usually, what is performed for the charge signal energy derivation step is a numerical computation step that uses data values the 2nd WSW which is a time window longer than the 1st WSW. Since an integration processing with a relatively longer time window is adopted for the numerical computation step, it is possible to minimize effects of electronic noise in the detection signal data sequence and to find precise amount of the electric charge generated by the radiation interaction. As a result, the amount of the electric charge is quantified, and data convertible to energy value is obtained. The present embodiment enables precise determination of the channel that gave a charge signal, thus it can reduce unnecessary processing such as the charge signal energy derivation step erroneously uses induced signals.

It should be noted that the charge signal energy derivation step can be started at any time point after a detection signal data sequence that collected the electric charge is clarified. The present embodiment is advantageous because the process steps until the determination step S06 are easy to practice by themselves, and the charge signal energy derivation step may be started at an early stage. For example, the timing data calculation step S02 through the determination step S06 are performed, in real time, while data values of the detection signal data sequence are received. During that, it is easily possible to perform the charge signal energy derivation step concurrently using the data values in the detection signal data sequence, even when a small amount of data buffer is utilized.

In the present embodiment it is possible to derive precise energy values even when an induced signal is overlapping the charge signal due to multi hit event, for example.

2-3. Implementation of Signal Processing for Hit Determination Filter

Figure 6:
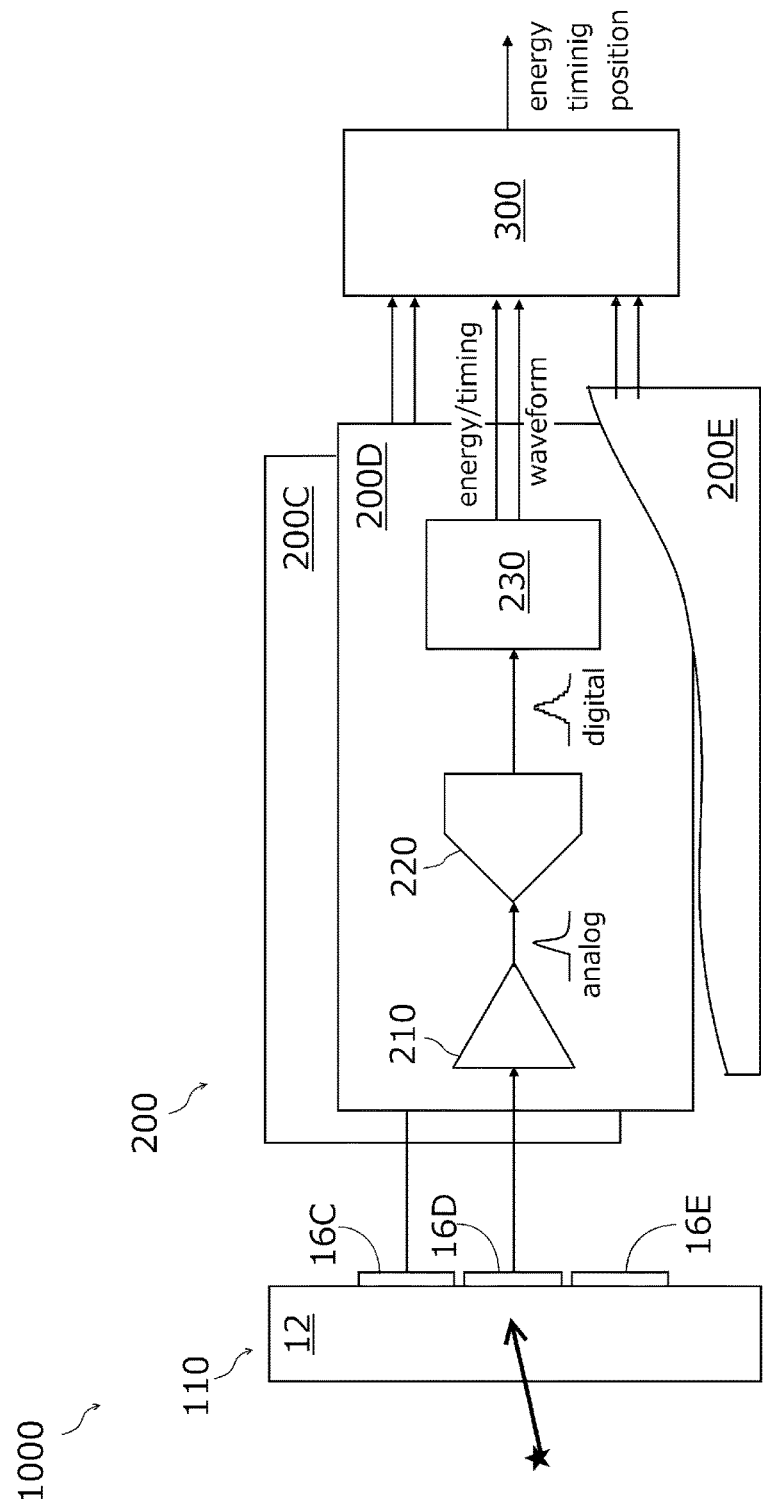
FIG. 6 is a functional block diagram generally indicating principal part of the logic structure of a semiconductor radiation detection system including a signal data processing device in an embodiment of the present invention.
Figure 7:
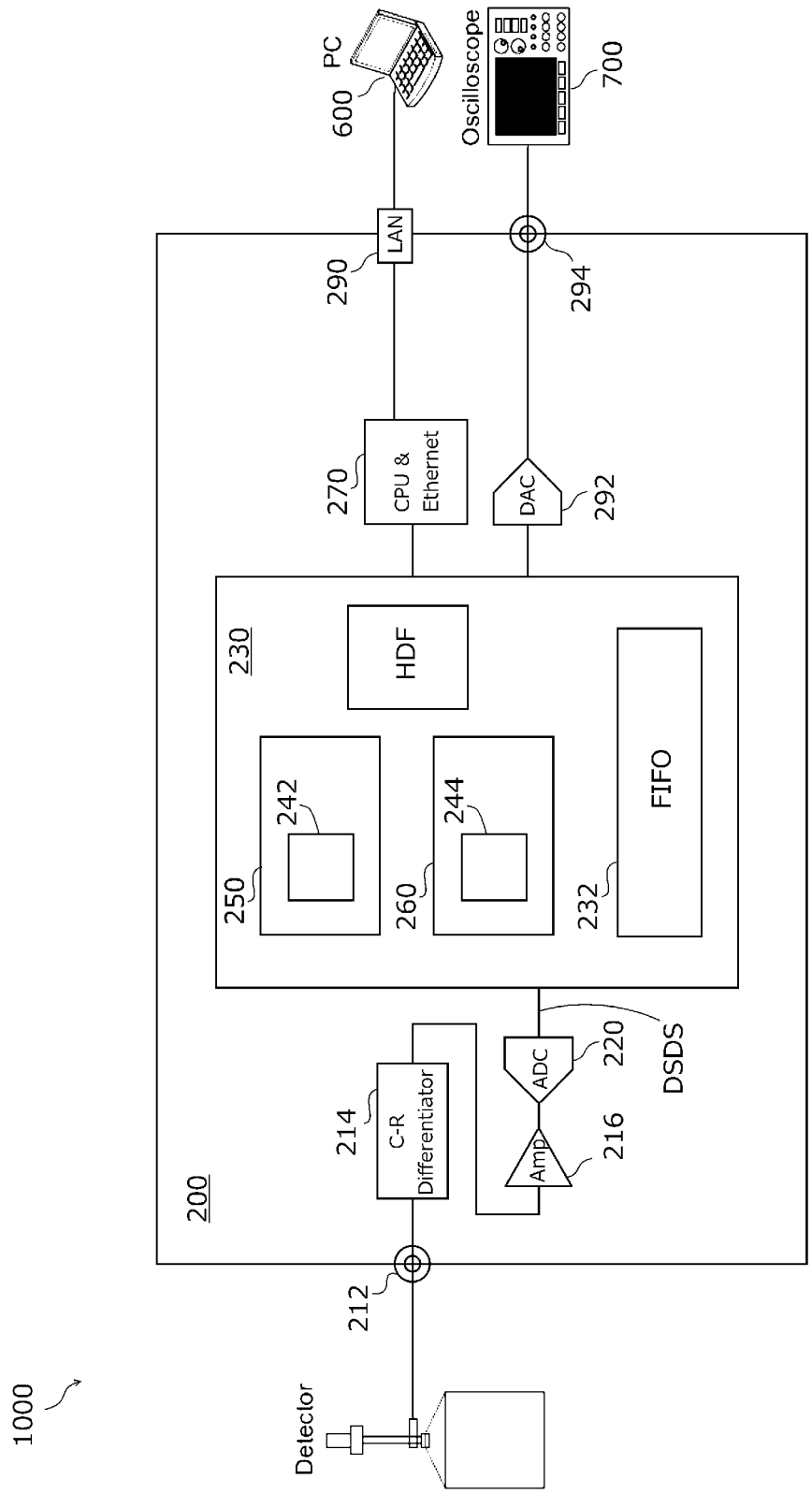
FIG. 7 is a block diagram indicating a general structure of one of hardware for a semiconductor radiation detection system including a signal data processing device in an embodiment of the present invention.

Now description is made regarding an overall structure and hardware structure of the signal data processing device provided to carry out the processing mentioned above in the present embodiment. FIG. 6 is a functional block diagram generally indicating principal part of the logic structure of a semiconductor radiation detection system including a signal data processing device in the present embodiment. FIG. 7 is a block diagram indicating a general structure of one of hardware for a semiconductor radiation detection system including a signal data processing device in the present embodiment. And FIG. 8 is a functional block diagram indicating a signal processing function blocks implemented in hardware of a signal data processing device in the present embodiment.

A semiconductor radiation detection system 1000 generally includes a signal data processing device 200 and, optionally, a waveform analyzer 300, in addition to a radiation detector 110 that forms a Compton camera 100.

The signal data processing device 200 is configured to independently process detection signals in parallel from each electrode attached to the semiconductor 12 in the radiation detector 110. For example in FIG. 6, each channel 200C 200D, and 200E processes in parallel with independent manner, where they correspond to the electrode 16C, 16D, and 16E of the radiation detector 110 respectively. Since typical process for the channels 200C, 200D, and 200E are identical with each other, the signal data processing device 200 is described without making a distinction among channels 200C, 200D, and 200E. It should be noted that the channels 200C, 200D, and 200E may be implemented with a single device in hardware that can handle plural channels, or with combined devices, while they are kept independent with one another.

The signal data processing device 200 converts a signal that has been preprocessed by an appropriate analog process circuitry 210 from a signal for analysis for each of the electrodes 16A-16M into a data sequence of digital signal waveform, or the detection signal data sequence. Then a digital signal processing device 230 is used for the timing data calculation step (S02, FIG. 5), the delay and detection step (S04), and the determination step (S06), mentioned above. The determination result obtained at the digital signal processing device 230 is then made identifiable in the form of output from the signal data processing device 200 by, such as, being included in the output, or in a form of recorded data. The determination result will be used in an arbitrary practical implementation that uses the information regarding precise determination of a channel from which the electric charge was obtained. Specifically, in an implementation example, the signal data processing device 200 outputs basic information regarding the interaction between the radiation and the semiconductor, such as timing and energy, and waveform data used in the later analysis process as needed. In so doing, for example, the information and the waveforms are output only for a channel that was precisely determined as one that collected the electric charge. In another implementation example, the output is made in a form that the output can be determined as to whether it is of the charge signal or not, through an appropriate frag, or trigger signal, when outputting the basic information and the waveform data.

The output based on the charge signal is used for analysis together with signals based on the induced signals as needed, by the waveform analyzer 300, which is optionally adopted in the present embodiment. The analysis may include analysis on the interaction positions, as well as information regarding energy, timing or the like. Although the same waveform analyzer 300 may be used also even in the conventional scheme, it is impossible to analyze as intended in the conventional scheme because of poor preciseness in the determination of the charge signal for signals obtained from a conventional counterpart of the signal data processing device 200. In contrast, however, since the correct information is output in the present embodiment based on the charge signal in accordance with the determination step mentioned above, the process is carried out as intended in the waveform analyzer 300. In a typical example, the process in the waveform analyzer 300 includes interaction positions refining process to determine interaction positions in more microscopic manner than the size of each region covered by the electrodes 16A-16M, 18A-18M, 26A-26M, and 28A-28M. For example, the information of the refined interaction positions is useful in determining the shape of each cone in FIG. 1 precisely, which greatly improves resolution of the radiation images by the Compton camera.

FIG. 7 depicts outline structure of one example hardware for implementing the signal data processing device having a logical structure in FIG. 6. Focusing on the hardware aspects of the structure of the signal data processing device 200, the outlines in conventional and in the present embodiment are similar except for the implementation of the logic operation process and numerical computation, described with reference to, for example, FIG. 5. Specifically, if the digital signal processing device 230 is implemented in a logic circuit by using, such as, an FPGA (field programmable gate array), then there is no difference in physical structure of the circuit parts between the implementations in the conventional and the present embodiment; rather the difference is found only in the functions substantially realized in the logic circuit on the FPGA device. The signal data processing device 200 receives signals from electrodes in the detector via the preamplifier (not shown in FIG. 7), and the output therefrom are finally forwarded to a computer 600 through an I/O interface 290 which is an arbitrary element selected from a LAN, for example. The functional means corresponding to the waveform analyzer 300 is not indicated in FIG. 7; however, such is implemented as needed from a practical point of view. The waveform analyzer 300 is implemented by a part of the circuitry in the digital signal processing device 230, in an additional hardware not shown in the figures, or in a process of software in the process module 270 or on the computer 600. Moreover, necessary post process such as imaging, including the function of the waveform analyzer 300 if necessary, may be carried out in the computer 600. The input signals from the input port 212 are differentiated while they are analog signals by an appropriate element, such as a C-R differentiation amplifier 214, and then their amplitudes are adjusted by gain adjustment or the like in the amplifier 216 for inputting to the ADC 220. The analog stage may include pole zero adjustment process, though it is not indicated in the figures. The ADC 220 acts sampling operation with an appropriate sampling rate, and with an appropriate bit length. The resulting data is the detection signal data sequence.

The detection signal data sequence from the ADC 220 is input to the digital signal processing device 230 that may be implemented by an appropriated integrated circuit technology such as FPGA. Functional block in the digital signal processing device 230 generally has an energy processing function 260, timing processing function 250, and hit determination filters (HDF). The timing processing function 250 and the energy processing function 260 are provided with digital pulse shapers 242 and 244 respectively, which produces shaped signals. The energy processing function 260, the timing processing function 250, and the HDF have functions of numerical computation and logical operation processes. Moreover, the digital signal processing device 230 has an appropriate buffer, such as a FIFO (first in first out) data buffer 232, which allows memory and delay functions for the numerical computation for the energy processing function 260, the timing processing function 250, and the HDF. The signal data processing device 200 has not only the digital signal processing device 230, but also processing module 270 for managing process by the digital signal processing device 230, and for related communications. The signal data processing device 200 may have a digital-to-analog converter (DAC) 292, and an analog signal output port 294, for the purpose of monitoring the real-time status for each stages of the data processing. For example, an oscilloscope 700 connected to the analog signal output port 294 is used for monitoring the waveforms. The monitoring of the waveforms enables to obtain measures for setting thresholds in the hit determination filter (first and the second threshold values) and the delay time window.

A functional block diagram in FIG. 8 indicates a signal processing algorithm implemented in hardware of a digital signal processing device 230 in the present embodiment. It should be noted that although the FIFO buffer 232 provides functions of buffer of data to be processed while capturing the waveform continuously and of buffer to pass the data to the CPU, it is not depicted in FIG. 8. FIG. 8 only indicates the algorithm.

The detection signal data sequence is input to the digital pulse shapers 242 and 244 after the polarity is changed by a signal polarity unifier 234 to have a single polarity, because they may have both polarities according to the output property of the preamplifier. The detection signal data sequence is processed with waveform shaping in a fast trapezoidal filter (FTF) and a slow trapezoidal filter (STF) at the digital pulse shapers 242 and 244 respectively. The digital pulse shapers 242 and 244 are indicated simply as FTF 242 and STF 244 respectively. The functions in the FTF 242 and STF 244 are numerical computation, for example, to conduct convolution with respective predetermined function in the respective waveform shaping window, the 1st WSW and 2nd WSW. A value for determining the 1st WSW and time constant in the function for convolution are selected such that they are suitable for determining timing information in the timing processing function 250. Therefore, the output from the FTF 242 is timing data sequence. Timing information in the timing data sequence from FTF 242 is extracted at a constant fraction discriminator (CFD) 252 in the timing processing function 250.

A typical example of the hit determination filter (HDF) in FIG. 7 of the present embodiment is indicated in FIG. 8a as a hit determination filter HDF1. The process function therein can be generally explained by a first discriminator (1ST-DISC) 262, a second discriminator (2ND-DISC) 264, and a gate logic 266. Upon receipt of the timing data sequence from the FTF 242, the 1ST-DISC 262 makes a comparison with the first threshold value. The process is an operation continuously performed while there are data values in the timing data sequence. In contrast, 2ND-DISC 264 makes a comparison with the second threshold value concerning the timing data value for determination, the data values delayed for a time delay in the timing data sequence. The hold operation in actual hardware can be practiced by continuously storing and reading out the timing data sequence in a memory region in the FIFO buffer 232, which can store data values at least for the delay time. This hold operation can be practiced with another simpler implementation, in which the FIFO buffer 232 operates shift function continuously and read out address indication is changed to denote a time point shifted by the delay time from one for the received data from the 1ST-DISC 262. If the results of two comparisons, one is the comparison with the first threshold value at the 1ST-DISC 262, and the other is the comparison with the second threshold value at the 2ND-DISC 264, indicate that both of respective threshold values are reached, a trigger signal is asserted by the gate logic 266.

It should be noted that the hit determination filter can be practiced in another implementation while keeping the equivalence of the logical function, which is indicated in a hit determination filter HDF2 in FIG. 8b. The hit determination filter HDF2 uses a 1ST-DISC 262A, 2ND-DISC 264A, and gate logic 226A, whose functions are substantially identical to those for the corresponding ones in the hit determination filter HDF1. However, the output from the 1ST-DISC 262A is used for operation of the 2ND-DISC 264A in the hit determination filter HDF2. In the operation, the 2ND-DISC 264A does not operate continuously; instead, it conduct the comparison with the second threshold only when a data value in the timing data sequence that reached the first threshold value is determined to exist by the 1ST-DISC 262A. Moreover the gate logic 266A may produce the trigger signal in response to the output from the 2ND-DISC 264A, not from the 1ST-DISC 262A. The details of the implementation of the hit determination filter can be modified by a person skilled in the art in consideration of other conditions such as types of buffers like the FIFO buffer or registers, or necessary scale of the circuitry.

The structure of the signal data processing device 200 in FIGS. 7 and 8 indicates only a single channel portion. When an FPGA is adopted for the digital signal processing device 230, function for plural channel of for the parts of the digital signal processing device 230 may be implemented into a single chip FPGA in the actual signal data processing device 200, depending on the scale of the number of gates that can be fabricated into the FPGA and the scale of the function block implemented therein. An example hardware device for the signal data processing device 200, or APV7109 (Techno AP Corporation, Hitachi-naka, Japan), is equipped with Stratix II ES2S60 (Altera, San Jose, Calif.) for the digital signal processing device 230, in which operations for eight channels are realized in one digital signal processing device 230. The device has sets of the input port 212-ADC 220 for eight channels on a single circuit board of VME module. The signal processing function block in the FIG. 8 is implemented in the digital signal processing device 230 in FIG. 7. The implementation may be selected from various semiconductor integration architectures other than the FPGA in the above, including ASIC (application specific integrated circuit), DSP (digital signal processor). Also, implementation into software on a general purpose computer may be practical.

If description is made in relation to the description regarding FIG. 8; the timing data calculation step S02 in FIG. 5 corresponds to process in the FTF 242, while the process descried as the delay and selection step S04 and the determination step S06 corresponds to the hit determination filter HDF1 or HDF2. An example process described based on the labeling step S08 is relevant to the trigger signal, the output from the hit determination filter HDF1 or HDF2.

On the other hand, if description is made in connection with the conventional scheme, in which a comparison is made regarding data values in the timing data sequence only with a single reference value for determining whether a charge signal has been detected or not, we can explain the operation in associated with a combination of 1ST-DISC 262 and the gate logic 266 in the hit determination filter HDF1. This is because the conventional scheme tried to conduct the determination only with a single reference value that can be associated with the single threshold value in the present embodiment.

In the present embodiment, the energy processing function 260 for process function of energy calculation is also implemented in the digital signal processing device 230, as stated above. In particular, the energy processing function 260 calculates an energy data sequence from the detection signal data sequence by the STF 244. The STF 244 performs waveform shaping by convolution using a time constant with a function suitable for quantifying an energy value in a time period of the 2nd WSW, which is longer than the 1st WSW in FTF 242. The output, energy data sequence is then amplified at an amplifier 268B for adjusting the dynamic range, and its baseline is adjusted so as not to be affected by the signal pile-up by a baseline restorer, BLR 268C. Thereafter, the upper and lower limit of the energy range for acquisition is set according to process through pulse height peak detector 268D, LLD (lower level discriminator) and ULD (upper level discriminator) 268E. The result for energy information is output. Since the BLR 268C is a circuit regarding a pile-up for energy value calculation, it is not directly related to the process in the 2ND-DISC 264 (in FIG. 5). The removal of the pile-up effect by the determination scheme, in the hit determination filter of the present embodiment is useful regardless of whether the BLR 268C is used or not.

Timing of the signal processing for measuring energy value may be delayed due to holding operation in 2ND-DISC 26 mentioned above in connection with the hit determination filter HDF1 or HDF2. In such a situation, a delay operation at an appropriate timing, such as by holder 268A is performed as needed.

Furthermore, the detection signal data sequence immediate after digitized operation or the timing data sequence output from the FTF 242 may be used as indicated in FIG. 6, in a specific implementation in which the waveform analyzer 300 uses the detection signal data sequence from the digital signal processing device 230 for further processing such as the interaction positions refining process. In the specific implementation, output from the gate logic 266 or 266A is used in selecting a channel on which the detection signal data sequence is obtained. For example, a detection signal data sequence is selectively output from the digital signal processing device 230 in response to the trigger signal value. Then the waveform analyzer 300 uses the trigger signal to identify which detection signal data sequence should be processed during the selection. Various implementations like these ones can be selected according to utilization purpose of the detection signal data sequence. For example, as in the interaction positions refining process, the waveform analyzer 300 in an implementation may use not only the charge signal, but also the induced signals from electrodes adjacent to the electrode that detected the electric charge. In such an implementation, while the digital signal processing device 230 outputs detection signal data sequence or timing data sequence even for the channels where the trigger signal is not asserted, the trigger signal for each channel is used by the waveform analyzer 300 in determination of the detection signal data sequence or TSD to process. Also in another preferable implementation of the digital signal processing device 230, the detection signal data sequence or timing data sequence for channels on which the charge signal is obtained is recorded using the result of the labeling step S08, by way of recording device (not shown) between the digital signal processing device 230 and waveform analyzer 300. Similarly, the detection signal data sequence or timing data sequence can be used for the analysis concerning induced signals, not for the charge signal.

The signal data processing device 200 in FIG. 8 can adopt the digital signal processing device 230 (FIG. 6) implemented in a signal data processing device suitable for real time processing, such as an FPGA, ASIC and DSP. The process in the 2ND-IDSC 264 is merely a delay and selection step, which can be practiced easily by the combination of date buffer such as the FIFO buffer 232, and selection of read out data. Such process requires only a practical scale in the circuit. In addition when the output from the signal data processing device 200 in FIG. 8 is used in waveform analyzer 300 in FIG. 6, there is no substantial problem in using the output data not only from the electrode where the charge signal is obtained, but also from electrodes adjacent to it.

2-4. Working Example

The inventors studied how well the present embodiment works using detection signals obtained from an actual radiation detector. We adopted a hardware circuit device of VME module identical to one reported in Non Patent Document 3, or AP7109. For comparison, a conventional scheme identical to one in Non Patent Document 3 was implemented in the first place, and the logic function was rewritten for the working example of the present embodiment to realize the functional block of the present embodiment mentioned earlier. Then a Compton camera was used for the semiconductor radiation detector, and $^{22}$Na point source, which emits 511 keV gamma ray, was measured. The signals obtained in this setting were used to calculate a ratio of charge signal events (effective events) within the total number of events. It has been confirmed that the ratio of the effective events for the Compton camera when the hit determination filter of the present embodiment was adopted become 7-8 times value for the conventional scheme. The primary reason for such improvement has been revealed by analyzing the waveforms gathered in such measurements: a ratio of effective events in the signals from the electrodes in the detector is around 50-60% in the conventional scheme, whereas it increased to almost 100% when the hit determination filter in the present embodiment is adopted. It should be noted that effective events need outputs of proper charge signals from both of the serially aligned two semiconductor plates, thus multiplied ratios regarding the number of effective events for both semiconductor plate surfaces affect the results. We suppose this has emphasized the ratio of the effective events in the Compton camera mentioned above. The improvement of the ratio of the effective events in this working example also suggests that the approach in the present embodiment should be effective, even when the multi-electrode radiation detectors whose signals are processed by the present embodiment are used in other applications than the Compton camera.

2-5. Modification of the Embodiment

The present embodiment may be modified into various forms so long as they are easily practiced by a person skilled in the art. The description in the above has been made mainly for a single interaction by the radiation took place. However, there may be multi-hit events in actual situations, in which plural interactions take place for a single radiation ray. Plural channels may collect the electric charge for such a situation. Therefore, the number of channels to be determined regarding the charge signal is not limited to one.

Moreover, the description has been made while keeping the correct determination of the charge signal in mind. The charge signals are useful in other applications, such as, energy measurement absorbed via interaction of the radiation, counting the number of events, and measuring coincidence. In this regard, it should be prevented to treat induced signal as if it is a charge signal. However, this does not mean that the induced signals are unnecessary; rather the induced signals can be advantageously utilized for the interaction positions refining process, as an example. It is necessary to make a distinction between a charge signal and an induced signal even for such application. Thus the present embodiment is useful due to the distinction capability regardless of specifics in the implementations.

Furthermore, although an example has been described with reference to FIGS. 3a-3b in the case the first and second threshold values are identical, the present embodiment is not limited to such an example. The first and second threshold values are responsible for different functions. The waveforms of the timing data sequence varies due to a time constant of the timing data calculation step and delay time, thus the first and second threshold values can be set independently, or in connection with each other. Example guidelines for setting of the threshold values include setting the first threshold value just above the noise level in the detection signal data sequence, which allows radiation measurement with an energy value as low as possible while preventing erroneous trigger assertions. The second threshold value is raised in the case when the number of charge signals determined in error is too large, whereas it is decreased in the case when erroneous rejection of events that should have been determined as charge signals must be reduced. Example guidelines for setting of the delay time include shortening the delay for preventing selection of induced signals in error for too large amplitude of the waveform at the time when compared with the second threshold after the delay, as can be seen in, for example, the signal in FIG. 3b. In contrast, it is effective to raise the second threshold value to prevent selection in error of a waveform of induced signal having a non-zero value for a relatively long time, as can be seen in the induced signal of FIG. 4b. In particular, since the second threshold and the delay time are closely related setting parameters with each other, it is useful to monitor the waveforms of timing data sequence as needed using the DAC 292 and the oscilloscope 700 mentioned above, and to set the parameters.

Usually the process is carried out in a common sampling frequency for the detection signal data sequence and the timing data sequence, thus the identical sampling frequency is also preferably used in implementing the present embodiment, though such is not specifically described. This is because a sampling rate conversion is usually prevented to avoid unnecessary complication except it is imperative, especially in the process of the digital filter operations. In addition to that, it is usual to set an operation clock pulse frequency for operation processing in the digital signal processing device 230 to the same values of the sampling frequency or to a value of integer times multiplication of it. However, when practicing the present embodiment the sampling rates for the detection signal data sequence and the timing data sequence are not limited to the same values, and there is no specific limitation on the operation clock pulse frequency for the operation in the digital signal processing device 230. These frequencies are selected as needed according to processing speed, an adopted semiconductor circuit technology, quantization bit length for signals, required accuracy for the operation, and other technological conditions.

On top of that, description has been made without specifying the electrode that gave the signals. However, some of the other channels for the radiation detector may be used without applying the present embodiment. Therefore, the present embodiment can be implemented only a part of the channels.

Furthermore, description has been made in connection with a Compton camera. However, the present embodiment can be applied to any type of radiation detectors having plural electrodes attached to a semiconductor, if an electrode that collected the electric charge should be identified. It is the present embodiment that can be applied when determining a channel that collected the electric charge based on the detection signal for a radiation detector having plural electrodes attached to a semiconductor. This means that radiation detectors to which the present embodiment can be applied are not limited to ones that detect the interaction twice, such as a Compton camera; they include ones that detects a single interaction. The shape of the semiconductor crystal may be plate, cylinder, or the like. For example, PET (positron emission tomography) device, which has a large number of radiation detectors (detection elements), each of which having plural electrodes attached to a semiconductor. If the present embodiment is applied to the PET device, the measurement can be carried out with high sensitivity and with high positional accuracy.

The determination step (hit determination filter), including other signal processing circuit, in the embodiment mentioned above may be implemented in other device than the FPGA. The determination step can be implemented into software that is operable on a general purpose computer while performing data processing for the detection signal data sequence or timing data sequence.

The embodiment of the present invention has been described specifically throughout the description set forth herein. Any parts of the description in this specification, including the embodiments and practical working examples are provided for the purpose of explaining the present invention; thus the scope of the invention should be determined based on recitations of the claims. Furthermore, any other variations based on any combination in the embodiment should be considered in the present invention, which variations should be also within a scope of the present invention.

INDUSTRIAL APPLICABILITY

The signal data processing method and signal data processing device for radiation detection, and a radiation detection system of the present invention may be applied for any radiation detection device having a semiconductor to which plural electrodes are attached.

REFERENCE SIGNS LIST

| | |
|---|---|
| 1000 | semiconductor radiation detection system |
| 100 | Compton camera |
| 110, 120 | radiation detectors |
| 12, 22 | semiconductors |
| 12F, 22F | front surface |
| 12B, 22B | rear surface |
| 16A-16M, 18A-18M, 26A-26M, 28A-28M | electrodes |
| 200 | signal data processing device |
| 210 | analog process circuitry |
| 212 | input port |
| 214 | C-R differentiation amplifier |
| 216 | amplifier |
| 220 | ADC (analog-to-digital converter) |
| 230 | digital signal processing device |
| 232 | data buffer (FIFO buffer) |
| 234 | signal polarity unifier |
| 242 | digital pulse shaper (fast trapezoidal filter, FTF) |
| 244 | digital pulse shaper (slow trapezoidal filter, STF) |
| 250 | timing processing function |
| 260 | energy processing function |
| 262, 262A | first discriminator (1ST-DISC) |
| 264, 264A | second discriminator (2ND-DISC) |
| 266, 266A | gate logic |
| 268A | holder |
| 268B | amplifier |
| 268C | BLR (baseline restorer) |
| 268D | pulse height peak detector |
| 268E | LLD (lower level discriminator) and ULD (upper level discriminator) |
| 270 | process module |
| 290 | I/O interface |
| 292 | DAC (digital-to-analog converter) |
| 294 | analog signal output port |
| 300 | waveform analyzer |
| 600 | computer |
| 700 | oscilloscope |
| C1, C2 | cone surfaces |
| T1, T2 | time points |
| ΔT | delay time |
| HDF, HDF1, HDF2 | hit determination filters |
| CFD | constant fraction discriminator |
| DSDS | detection signal data sequence |
| TDS | timing data sequence |
| IPRP | interaction positions refining process |
| TDVD | timing data value for determination |
| WSW | waveform shaping window |
| DISC | discriminator |

What is claimed is:

1. A system, comprising:
a semiconductor radiation detector having at least an electrode thereon; and
a processing device coupled to the electrode of the semiconductor radiation detector, the processing device including:
a timing processing block having a detection signal data sequence input and a timing data sequence output, the timing processing block configured to receive a detection signal data sequence at the detection signal data sequence input, and produce a timing data sequence at the timing data sequence output, the timing data sequence representative of radiation ray detection events in the detection signal data sequence; and a hit determination filter coupled to the timing data sequence output and a trigger output, the hit determination filter including:

a first discriminator block coupled to the timing data sequence output and set to a first threshold value;

a second discriminator block coupled to the timing data sequence output and set to a second threshold value; and a gate logic coupled to the second discriminator block, the gate logic coupled to the trigger output, wherein the trigger output is asserted at the gate logic if the timing data sequence reaches the first threshold value at the first discriminator block and the timing data sequence reaches the second threshold value after elapse of a predetermined delay time from the timing data sequence reaching the first threshold value; and an energy processing block coupled to the detection signal data sequence input and the trigger output, the energy processing block configured to generate an output indicative of an energy value collected by the electrode on the semiconductor radiation detector from the detection signal data sequence in response to the trigger output being asserted, wherein the first threshold value is configured to detect a rise in the timing data sequence, the second threshold value is configured to distinguish a charge signal that is indicative of electric charge collection at the electrode being generated by radiation from an induced signal that is indicative of an electric signal variation at the electrode being generated by another electrode, the first and second threshold values are set independently with each other, and the predetermined delay time is initiated when the timing data sequence reaches the first threshold value at the first discriminator block, and wherein the processing device is configured to output a signal with the timing data sequence or the detection signal data sequence, the signal output by the processing device corresponds to the charge signal when the timing data sequence reaches the first threshold value at the first discriminator block and the timing data sequence reaches the second threshold value after elapse of the predetermined delay time from the timing data sequence reaching the first threshold value, and the signal output by the processing device corresponds to the induced signal when the timing data sequence is reaches the first threshold value at the first discriminator block and the timing data sequence is below the second threshold value after elapse of the predetermined delay time from the timing data sequence reaching the first threshold value.

2. The system of claim 1, wherein the timing processing block includes a fast trapezoidal filter coupled between the detection signal data sequence input and the timing data sequence output, and the energy processing block includes a slow trapezoidal filter coupled between the detection signal data sequence input and the trigger output.

3. The system of claim 1, wherein the first discriminator is coupled to the gate logic, and the gate logic is configured to process an output of the first discriminator with an output of the second discriminator.

4. The system of claim 1, wherein the first discriminator is coupled to the second discriminator, first discriminator configured to activate the second discriminator.

5. The system of claim 1, wherein the semiconductor radiation detector has a plurality of electrodes, each covering different portion of the semiconductor radiation detector, wherein the system includes a plurality of processing devices, each of the plurality of processing devices is coupled to one of the plurality of electrodes and includes the timing processing block, and the hit determination filter, and wherein each of the plurality of processing devices outputs waveform data corresponding to a charge signal or an induced signal of the coupled electrode depending on whether the coupled electrode of the processing device has collected an electric charge or not, respectively.

6. The system of claim 1 wherein the processing device includes a waveform analyzer configured to determine an interaction position between a radiation ray and the semiconductor radiation detector when the signal output by the processing device corresponds to the induced signal.

7. The system of claim 1, wherein the first threshold value is set to be above a noise level of the detection signal data sequence.

8. A system, comprising:

a semiconductor radiation detector having at least an electrode thereon; and a processing device coupled to the electrode of the semiconductor radiation detector, the processing device including:

a timing processing block having a detection signal data sequence input and a timing data sequence output, the timing processing block configured to receive a detection signal data sequence at the detection signal data sequence input, and produce a timing data sequence at the timing data sequence output, the timing data sequence representative of radiation ray detection events in the detection signal data sequence; and a hit determination filter coupled to the timing data sequence output and a trigger output, the hit determination filter including:

a first discriminator block coupled to the timing data sequence output and set to a first threshold value;

a second discriminator block coupled to the timing data sequence output and set to a second threshold value; and a gate logic coupled to the second discriminator block, the gate logic coupled to the trigger output, wherein the trigger output is asserted at the gate logic if the timing data sequence reaches the first threshold value at the first discriminator block and the timing data sequence reaches the second threshold value after elapse of a predetermined delay time from the timing data sequence reaching the first threshold value; and an energy processing block coupled to the detection signal data sequence input and the trigger output, the energy processing block configured to generate an output indicative of an energy value collected by the electrode on the semiconductor radiation detector from the detection signal data sequence in response to the trigger output being asserted, wherein the first threshold value is configured to detect a rise in the timing data sequence, the second threshold value is configured to distinguish a charge signal that is indicative of electric charge collection at the electrode being generated by radiation from an induced signal that is indicative of an electric signal variation at the electrode being generated by another electrode, the first and second threshold values are set independently with each other, and the predetermined delay time is initiated when the timing data sequence reaches the first threshold value at the first discriminator block, and wherein the processing device is configured to output a signal with the timing data sequence or the detection signal data sequence with a label denoting a type of signal, the label corresponds to the charge signal when the timing data sequence reaches the first threshold value at the first discriminator block and the timing data sequence reaches the second threshold value after elapse of the predetermined delay time from the timing data sequence reaching the first threshold value, and the label corresponds to the induced signal when the timing data sequence is reaches the first threshold value at the first discriminator block and the timing data sequence is below the second threshold value after elapse of the predetermined delay time from the timing data sequence reaching the first threshold value.

9. The system of claim 8, wherein the first discriminator is coupled to the gate logic, and the gate logic is configured to process an output of the first discriminator with an output of the second discriminator.

10. The system of claim 8, wherein the first discriminator is coupled to the second discriminator, first discriminator configured to activate the second discriminator.

* * * * *